(12) United States Patent
Bayer et al.

(10) Patent No.: US 10,223,127 B2
(45) Date of Patent: Mar. 5, 2019

(54) SECURELY REMOVING SYSTEM CAPABILITIES FROM A LOGICAL PARTITION

(71) Applicant: INTERNATIONAL BUSINESS MACHINES CORPORATION, Armonk, NY (US)

(72) Inventors: Gerd Bayer, Boeblingen (DE); Robert Kieninger, Boeblingen (DE); Marco Kraemer, Boeblingen (DE); Jakob C. Lang, Boeblingen (DE); Angel Nunez Mencias, Boeblingen (DE); Stefan Roscher, Boeblingen (DE); Stefan Usenbinz, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/264,693

(22) Filed: Sep. 14, 2016

(65) Prior Publication Data
US 2017/0249157 A1 Aug. 31, 2017

(30) Foreign Application Priority Data
Feb. 29, 2016 (GB) .................................. 1603469.6

(51) Int. Cl.
*G06F 9/4401* (2018.01)
(52) U.S. Cl.
CPC .......... *G06F 9/4401* (2013.01); *G06F 9/4411* (2013.01)
(58) Field of Classification Search
CPC .............................. G06F 9/4401; G06F 9/4411

USPC ............... 710/308, 8; 370/230; 713/2; 718/1
See application file for complete search history.

(56) References Cited

U.S. PATENT DOCUMENTS

| 6,807,643 | B2* | 10/2004 | Eckardt | ............... | G06F 11/2284 |
| | | | | | 713/2 |
| 7,313,637 | B2 | 12/2007 | Tanaka et al. | | |
| 7,836,238 | B2 | 11/2010 | Friemuth et al. | | |
| 8,301,818 | B2 | 10/2012 | Zou et al. | | |
| 8,914,606 | B2 | 12/2014 | Culter | | |
| 2008/0244574 | A1* | 10/2008 | Shanbhogue | ....... | G06F 9/45558 |
| | | | | | 718/1 |
| 2009/0113422 | A1* | 4/2009 | Kani | ..................... | G06F 9/5077 |
| | | | | | 718/1 |
| 2009/0164990 | A1* | 6/2009 | Ben-Yehuda | ........... | G06F 9/545 |
| | | | | | 718/1 |

(Continued)

OTHER PUBLICATIONS

"PCI Hot Plug Management", Downloaded from internet Jan. 21, 2016, pp. 1-3.

*Primary Examiner* — Aurel Prifti
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Securely removing system capabilities, being available to at least one logical partition, from that partition, the partition being hosted by a computer system running an operating system. The system capabilities are available to a boot loader of the computer system, wherein the boot loader is started in the logical partition. The logical partition remains activated while removing the system capabilities. A removal request is initiated by the boot loader; and a deconfigure command is performed by the boot loader.

20 Claims, 5 Drawing Sheets

(56) References Cited

U.S. PATENT DOCUMENTS

| | | | |
|---|---|---|---|
| 2010/0262722 A1* | 10/2010 | Vauthier | G06F 3/14 710/8 |
| 2011/0029693 A1* | 2/2011 | Brinkmann | G06F 13/4081 710/8 |
| 2014/0156898 A1 | 6/2014 | Luo et al. | |
| 2016/0019079 A1* | 1/2016 | Chawla | G06F 9/45558 710/308 |
| 2016/0127492 A1* | 5/2016 | Malwankar | H04L 67/2842 709/212 |
| 2016/0182391 A1* | 6/2016 | Theobald | H04L 12/4641 370/230 |

\* cited by examiner

SECURELY REMOVING SYSTEM CAPABILITIES FROM A LOGICAL PARTITION

PRIOR FOREIGN APPLICATION

This application claims priority from the United Kingdom patent application number 1603469.6, filed Feb. 29, 2016, which is hereby incorporated herein by reference in its entirety.

BACKGROUND

One or more aspects of the present invention relate in general to data processing systems, and in particular, to securely removing system capabilities from a logical partition on a computer system.

Computing devices (such as desktop computers, laptop computers, server computers, and the like) typically include one or more system buses for connecting devices to the computing device. Some devices connect to computing devices via buses, such as the known universal serial bus, that enable the devices to be physically hot plugged. A device is able to be physically hot plugged if it can be physically connected to or disconnected from the bus during operation of the computing device without causing errors or damage to the computing device. Other devices connect to computing devices via buses, such as many implementations of the PCI (Peripheral Component Interconnect) bus, that might not enable the devices to be physically hot plugged. Connecting a PCI device to the PCI bus or disconnecting a PCI device from the PCI bus during operation of the computing device may cause errors in the computing device and may even physically damage the computing device.

Multifunction devices, i.e. devices that include multiple functions that are separately utilizable by a computing device, are known to implement the various functions with "virtual devices". Because of being functional components of the device, virtual devices are not separately hot pluggable. If a multifunction device is physically hot plugged or unplugged, the virtual devices are all added and removed, respectively, along with the physical/actual device. If the multifunction device is not physically hot pluggable, the virtual devices of that multifunction device cannot be added or removed during operation of the computing device.

Although typical device lists and virtualized device lists enable adding and removing devices that are able to be physically hot plugged during operation of a computing device, they do not support adding or removing devices that are not able to be physically hot plugged. Typical device lists and virtualized device lists also do not enable virtually hot plugging devices (adding or removing devices for an operating system or virtualized operating system without physically connecting/disconnecting the devices from the respective bus) or hot plugging of virtual devices.

SUMMARY

Shortcomings of the prior art are overcome and additional advantages are provided through the provision of a computer-implemented method of securely removing system capabilities, being available to at least one logical partition, from a logical partition, the logical partition being hosted by a computer system. The method includes, for instance, initiating, by a boot loader started in the logical partition of the computer system, a removal request to remove the system capabilities available to the boot loader; and performing, by the boot loader, a deconfigure command to remove the system capabilities, the logical partition to remain activated while removing the system capabilities.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with the above-mentioned and other objects and advantages may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of aspects of the invention. Moreover, the drawings are intended to depict only typical embodiments of aspects of the invention, and therefore, should not be considered as limiting the scope of aspects of the invention.

The illustrative embodiments described herein provide a method, system, and computer program product for securely removing system capabilities from a logical partition on a computer system. The illustrative embodiments are sometimes described herein using particular technologies only as an example for the clarity of the description.

The illustrative embodiments may be used for securely removing system capabilities, being available to at least one logical partition, from that partition, the partition being hosted by a computer system running an operating system, wherein the system capabilities are available to a boot loader of the computer system, wherein the boot loader is started in the logical partition, and the logical partition is remaining activated while removing the system capabilities.

In this context, system capabilities may comprise a queue based transport protocol (QTP) device, or a virtual PCI device, or even a physical PCI device.

Figure 1:
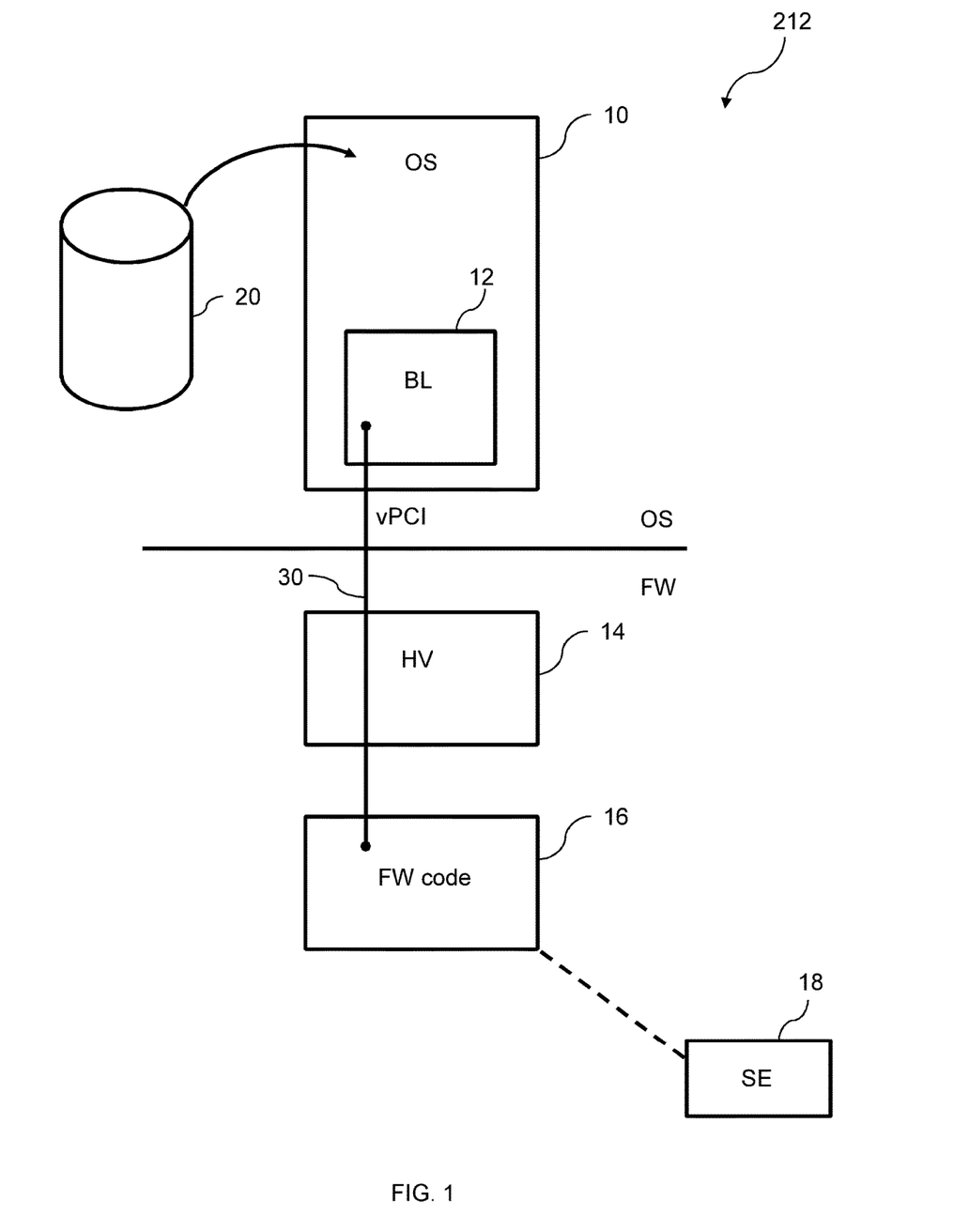
FIG. 1 a system diagram of a part of a computer system with a virtual queue based transport protocol device being available to a logical partition according to an embodiment of the invention.

FIG. 1 depicts a system diagram of a part of a computer system 212 with a virtual queue based transport protocol device 30 as system capabilities being available to a logical partition 10 according to an embodiment of the invention.

In the partitioned computer system environment 212, the initial first stage of the operating system (OS) boot process is typically executed by hardware/firmware (HW/FW) functionality. It does so by running HW/FW provided code within the context of the computer system partition 10. This code requires more system functionality than what should be granted to the running operating system OS. The boot loader (BL) 12 is loaded from the SE (service element) 18 to the partition 10. During startup of the boot loader 12, system capabilities as a bidirectional communication path 30 with the virtual queue based transport protocol device realized as a virtual PCI device, are established. The communication channel 30 is a path for communicating from the partition 10 to the FW code 16, communication being controlled by a hypervisor (HV) 14. Thus, the FW code 16 may communicate via the partition 10 with another partition. Also information like configuration data may be retrieved from a service element (SE) 18 via the FW code to the partition 10 with this communication channel 30. Thus, file transfers to/from the SE 18, or a network connection to the SE 18 may be established. The communication channel 30 however shall not be available to the regular operating systems. On top of the virtual PCI device interfaces as queue based transport protocol are implemented, which uses the PCI architecture for memory management, interrupts etc. The virtual PCI interface 30 is automatically assigned by FW during partition activation based on the partition mode.

The queue based transport protocol interface 30 is a communication protocol based on the virtual PCI device to allow for communication between a logical partition 10 and the FW 16. The queue based transport protocol interface 30 thus is a transport layer where communication is performed using work queues and completion queues.

The boot loader 12 uses the queue based transport protocol FW interface 30 to boot a SW (software) appliance. The boot loader 12 also loads and starts non-FW code. The non-FW code is not allowed to access special FW interfaces, like the queue based transport protocol device 30. Therefore, all queue based transport protocol devices are removed before executing non-FW code. A queue based transport protocol device is not to be made available, in one example, as long as non-FW code is executed. But dynamic I/O is not used to remove a queue based transport protocol device as queue based transport protocol interfaces are not defined in the IOCDS and the SE 18 does not know the queue based transport protocol interfaces. A queue based transport protocol device could be removed (made invisible to a partition) via a service call logical processor (SCLP) Write Event Data command (Adapter Error Notification), but this would be treated as a HW failure.

In this context, the SCLP is an interface between the operating system OS and the SE 18. SCLP services are, e.g. used by the operating system Linux. The SCLP allows to configure and deconfigure I/O adapters.

Figure 2:
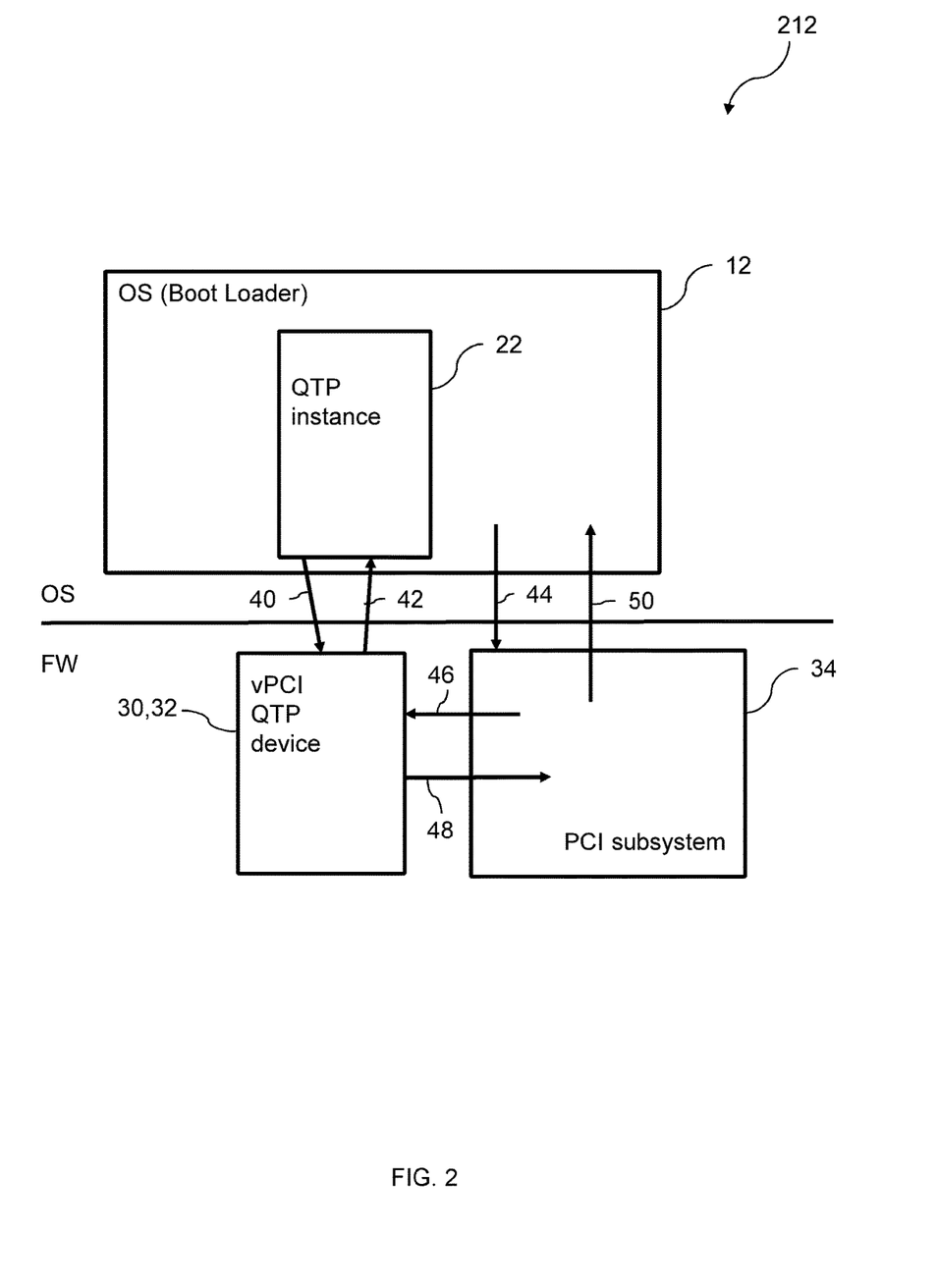
FIG. 2 a system diagram and process chart for securely removing a virtual queue based transport protocol device from a logical partition of a computer system according to an embodiment of the invention.

According to an aspect of the invention, referring to FIG. 2, an in-band queue based transport protocol (QTP) interface 22 is implemented to request removal of a queue based transport protocol device 32 on an SCLP deconfigure command 44. The queue based transport protocol device 32 is not returned without a reactivation of the partition 10. The queue based transport protocol device 32 is marked as removed so that the FW 16 will not add this device 32 again without partition 10 re-activation. For this purpose, a removal flag is added to the device data. A queue based transport protocol DBus application is used to communicate the removal request 40, where the DBus interface is one open source application being based on the queue based transport protocol transport layer. Particularly, the DBus interface is a communication protocol for commands being used as a remote procedure call. To achieve this, an implementation of the SCLP deconfigure command 44 is enhanced to automatically remove the queue based transport protocol device 32 from the configuration if the in-band removal request 40 has been placed before. A check for the removal flag is performed for vPCI queue based transport protocol devices 32 (vPCI means virtual PCI) and the removal is performed, e.g., only on a successful deconfigure command 44 for vPCI queue based transport protocol devices 32 where the removal flag is enabled. Thus, the removal of the system capabilities 30, particularly of the queue based transport protocol virtual PCI device 32 is possible without availability of the SE 18. The removal is triggered by the boot loader 12 and the removed queue based transport protocol device 32 is not made available again to the partition 10 without partition reactivation which ensures that trusted FW code is executed. The operating system does not have any access to the FW provided queue based transport protocol device 32 after removal of the queue based transport protocol device 32. The boot loader 12 is able to decide if the queue based transport protocol device 32 will be provided to an operating system being booted or not.

Issuing the deconfigure command 44 after the queue based transport protocol removal request 40 enables the computer system 212 to remove the system capabilities 30 completely and unconditionally from the partition 10, whereas issuing a single deconfigure command according to the state of the art enables the system capabilities 30 to be restored by a configure command. The partition 10 may be active during the whole removal process according to an aspect of the invention.

Thus, the computer system 212 is able to handle confidential data in a trusted way during the boot loader 12 operating, like deciphering loaded data in a trusted way, as the boot loader 12 exhibits privileges which the boot loader 12 is able to remove itself. So an operating system, as the boot loading process of the computer system 212, may be started only after the boot loader 12 has been deactivated, resulting in maintaining a trusted way of processing confidential data, as the system capabilities 30, like the virtual PCI queue based transport protocol device 32, are no longer available to the partition 10.

FIG. 2 shows a system diagram and process chart for securely removing system capabilities 30, like a virtual queue based transport protocol device 32 from a logical partition 10 of a computer system 212 according to an embodiment of the invention.

A method of an aspect of the present invention describes securely removing system capabilities 30, being available to at least one logical partition 10, from that partition 10. The partition 10 is hosted by a computer system 212 running an operating system OS, as shown in FIG. 1. The system capabilities 30 are available to the boot loader 12 of the computer system 212. The boot loader 12 is started in the logical partition 10, and the logical partition 10 remains activated while removing the system capabilities 30. The method then comprises initiating a removal request 40 by the boot loader 12; and performing a deconfigure command 44 by the boot loader 12. The removal request 40 is based on an in-band queue based transport protocol interface 22. The deconfigure command 44 is implemented by a service-call-logical processor (SCLP).

A DBus application is used to communicate the removal request 40 to the operating system. For this purpose it is advantageous if the removal request 40 is implemented in the DBus application.

On the OS side of the computer system 212 the boot loader 12 provides the queue based transport protocol instance 22 for issuing the in-band removal request 40 to the queue based transport protocol device 32 realized as the virtual PCI device. An acknowledge 42 is issued as a response to the queue based transport protocol instance 22. Next the SCLP deconfigure command 44 is sent to the PCI subsystem 34. The PCI subsystem 34 performs a hot removal 46 of the queue based transport protocol device 32, which is signaled by the hot removal complete command 48 to the PCI subsystem 34. Then the PCI subsystem 34 issues a return code 50 to the boot loader 12 signaling the deconfigure process as complete. As the deconfigure process is an asynchronous process, the boot loader 12 is waiting for an acknowledge signaling that the process has been completed. According to an aspect of the invention, the deconfigure command 44 is thus unconditionally removing the system capabilities 30 after the removal request 40 has been performed.

Figure 3:
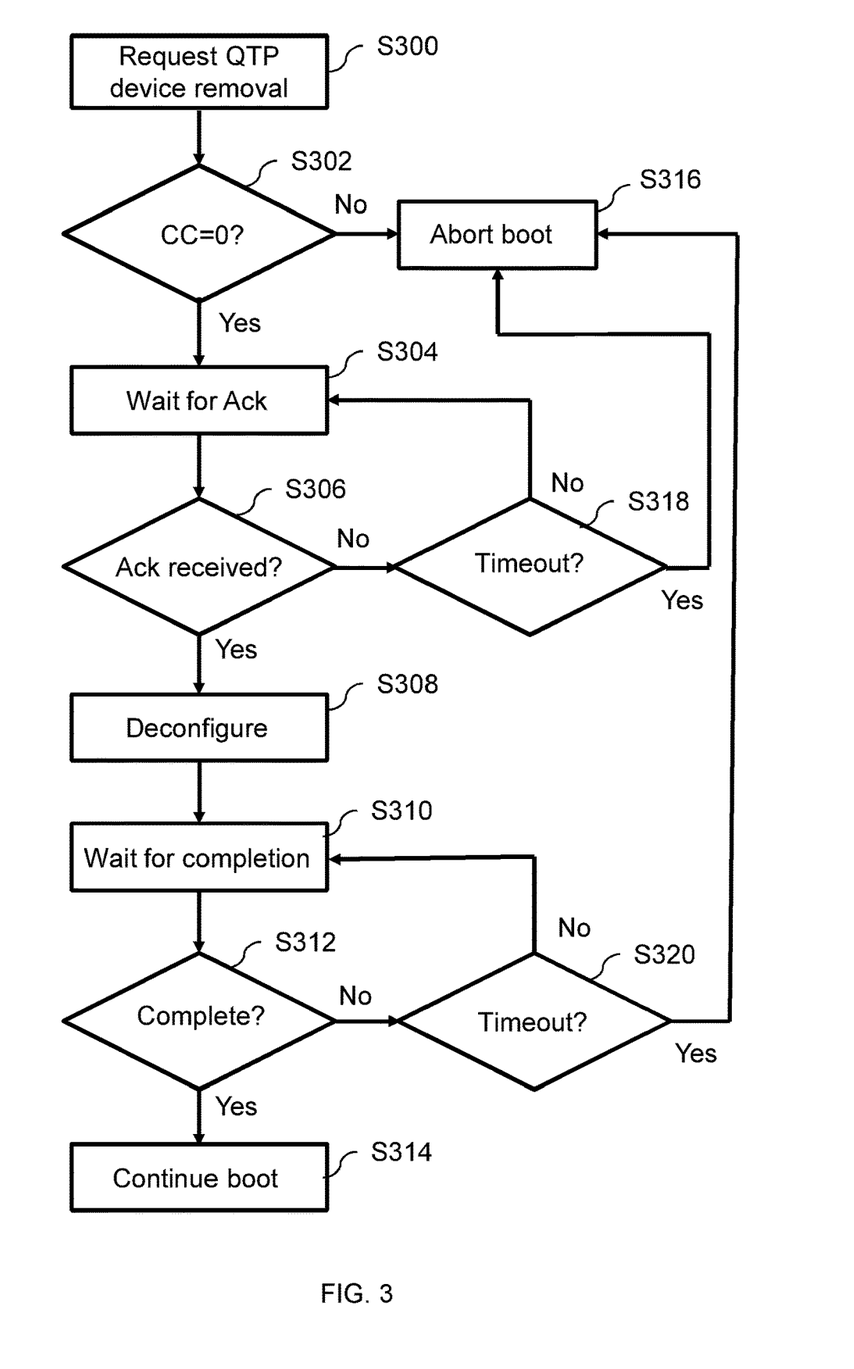
FIG. 3 a flowchart for process flow on the operating system side for securely removing system capabilities from a logical partition according to an embodiment of the invention.

In FIG. 3, one example of a flowchart for process flow on the operating system side for securely removing system capabilities 30 from a logical partition 10 according to an embodiment of the invention is depicted. The process starts on the OS side initiated by the boot loader 12 with a queue based transport protocol device removal request 40 in step S300, followed by a check for a condition code (CC) in step S302. If the CC is unequal to zero, the booting process is aborted in step S316. If CC equals zero, the process continues in step S304 with waiting for an acknowledge flag. If the acknowledge is received in step S306, the process continues in step S308 with issuing the deconfigure command 44. Otherwise, waiting for an acknowledge is continued by checking for a timeout in step S318, followed also by aborting the booting process in step S316, if a timeout occurred. If there is no timeout in step S318, the process flow is continued in step S304 again with waiting for the acknowledge. Continuing the deconfigure command 44 is done by waiting for completion in step S310 with a check for completion in step S312. As long as there is no completion, a check for timeout is performed in step S320 with a loop back to step S310, if there is no timeout, or an abort in step S316, if there is a timeout. If completion of the deconfigure command 44 is signaled, the boot process continues in step S314.

Figure 4:
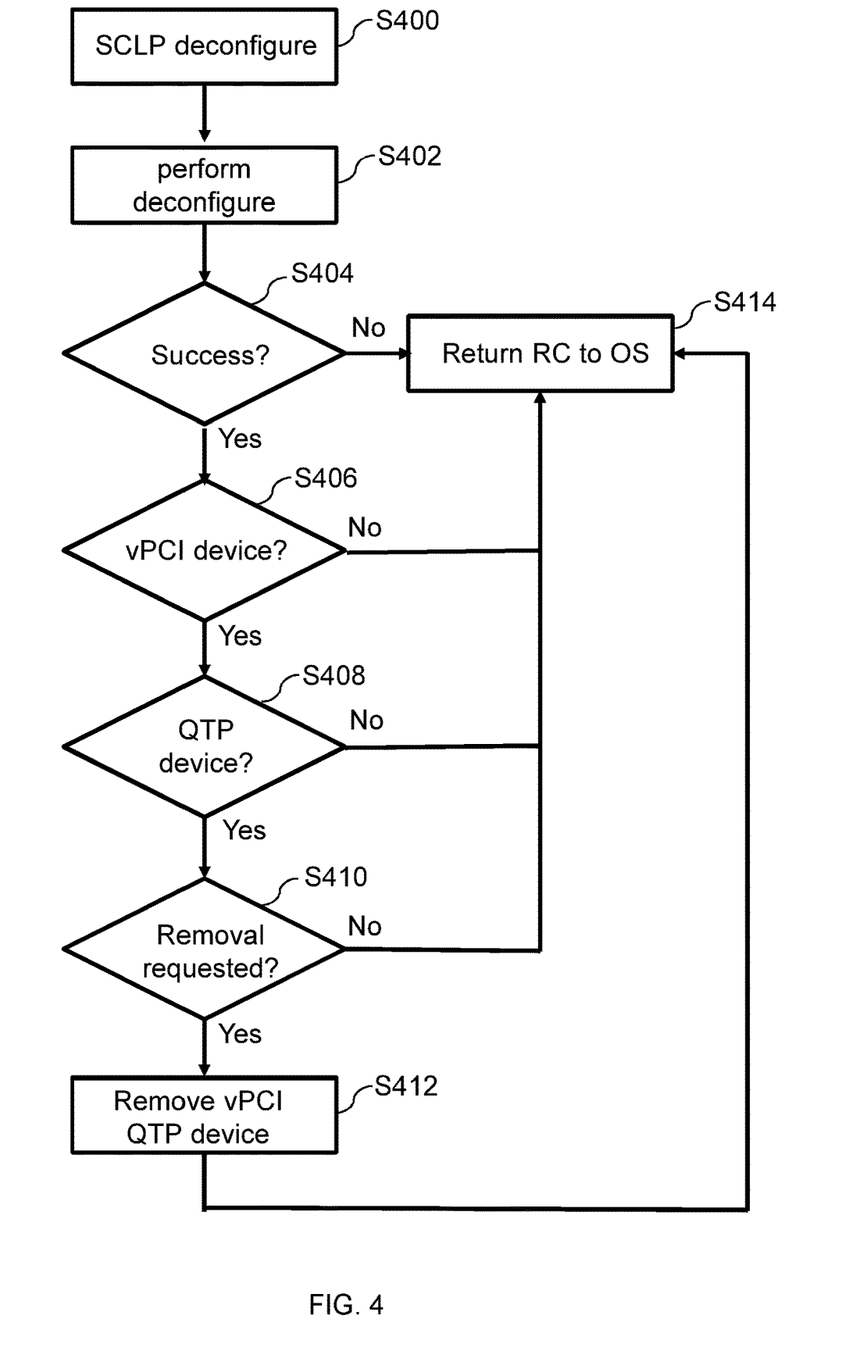
FIG. 4 a flowchart for process flow on the firmware side with details of the deconfigure command for securely removing system capabilities from a logical partition according to an embodiment of the invention.

In FIG. 4, one example of a flowchart for process flow on the firmware side with details of the deconfigure command 44 for securely removing system capabilities 30 from a logical partition 10 according to an embodiment of the invention is shown. The SCLP deconfigure command 44 on the FW side starts with the deconfigure request in step S400. The deconfigure command 44 is executed in step S402 followed by a check for success of the command 44 in step S404. If this is unsuccessful, a return code (RC) is signaled to the OS in step S414. If successful, the process continues in step S406 with a check if a virtual PCI device 32 is the object. If this is false, a return code is fed back to the OS. If this is true, a further check for a queue based transport protocol device is performed in step S408. If false, also a return code is fed back to the OS. If this is true, a further check is performed if the removal of the system capability queue based transport protocol device is requested in step S410. This may be performed by adding a removal flag to the system capabilities data, when issuing the queue based transport protocol removal command 40 and the deconfigure command 44 removing the system capabilities 30 if the removal flag is enabled.

If there is a false resulting in step S410, a return code is fed back to the OS. If the removal has been requested, the virtual PCI device as a queue based transport protocol device is removed from the partition 10 in step S412, followed by the return of a return code to the OS.

Figure 5:
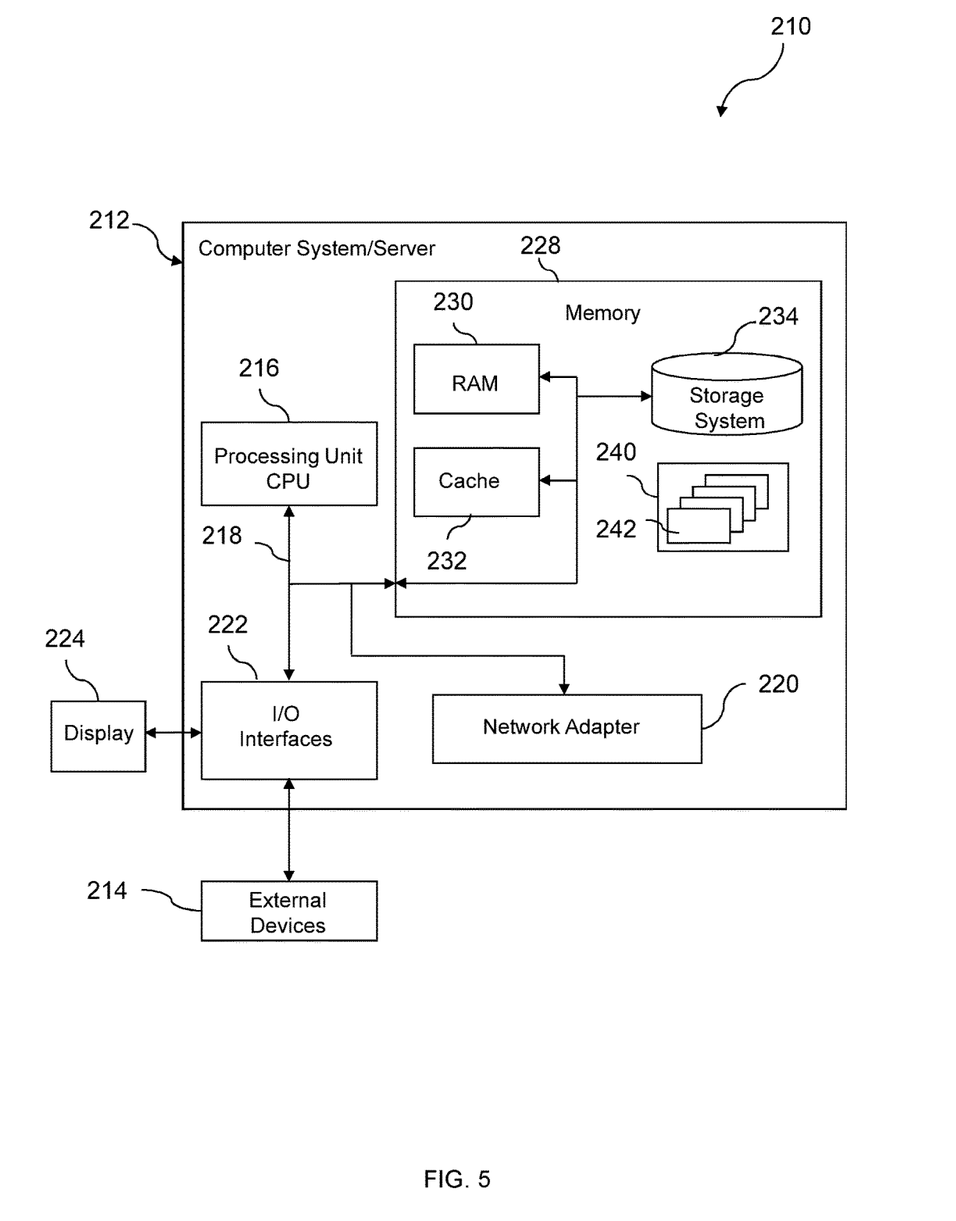
FIG. 5 an example embodiment of a data processing system for executing a method according to one or more aspects of the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As described herein, a method is provided for securely removing system capabilities, being available to at least one logical partition, from that partition, the partition being hosted by a computer system running an operating system, wherein the system capabilities are available to a boot loader of the computer system, wherein the boot loader is started in the logical partition, the logical partition remaining activated while removing the system capabilities. The method comprises initiating a removal request by the boot loader; and performing a deconfigure command by the boot loader.

In a partitioned computer system environment, the initial first stage of an operating system boot process is typically executed by hardware/firmware (HW/FW) functionality. It does so by running HW/FW provided code within the context of a computer system partition. This code requires more system functionality than what should be granted to the running operating system.

According to an aspect of the invention, system capabilities available to the logical partition are dropped through a sequence of commands initiated by a boot loader of the computer system. These system capabilities are only returned to the logical partition after the partition has been reset and the boot loader has been reconstructed by FW within the partition memory.

Further, a computer program product is provided for securely removing system capabilities, being available to at least one logical partition, from that partition, the partition being hosted by a computer system running an operating system, wherein the system capabilities are available to a boot loader of the computer system, wherein the boot loader is started in the logical partition, the logical partition remaining activated while removing the system capabilities, the computer program product comprising a computer readable storage medium having program instructions embodied therewith, the program instructions executable by a computer to cause the computer to perform a method comprising: initiating a removal request by the boot loader; and performing a deconfigure command by the boot loader.

Further, a data processing system for execution of a data processing program is provided, comprising computer readable program instructions for performing the method described above.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of securely removing system capabilities, being available to at least one logical partition, from a logical partition, the logical partition being hosted by a computer system, the computer-implemented method comprising:
providing, by a boot loader started in the logical partition of the computer system, an in-bound queue based transport protocol (QTP) instance;
issuing by the QTP instance, a QTP removal request to remove system capabilities available to the boot loader;
receiving, by the QTP instance, an acknowledgment of the QTP removal request; and
issuing, by the boot loader, a deconfigure command to perform a hot removal of the system capabilities, wherein the system capabilities are not reconfigurable, the logical partition to remain activated while removing the system capabilities.

2. The computer-implemented method according to claim 1, wherein the system capabilities comprise a queue based transport protocol device.

3. The computer-implemented method according to claim 1, wherein the system capabilities comprise a virtual Peripheral Component Interconnect device.

4. The computer-implemented method according to claim 1, wherein the system capabilities comprise a physical Peripheral Component Interconnect device.

5. The computer-implemented method according to claim 1, wherein the removal request is based on an in-band queue based transport protocol interface.

6. The computer-implemented method according to claim 1, wherein the deconfigure command is implemented by a service-call-logical processor.

7. The computer-implemented method according to claim 1, further comprising adding a removal flag to system capabilities data.

8. The computer-implemented method according to claim 7, further comprising checking by the deconfigure command for the removal flag.

9. The computer-implemented method according to claim 8, wherein the removing the system capabilities by the deconfigure command comprises removing the system capabilities, based on the removal flag being enabled.

10. The computer-implemented method according to claim 1, further comprising using a DBus application to communicate the removal request to an operating system of the computer system.

11. The computer-implemented method according to claim 10, wherein the removal request is implemented in the DBus application.

12. The computer-implemented method of claim 1, wherein the computer system comprises a peripheral component interconnect (PCI) subsystem, and wherein performing the hot removal comprises:
   issuing, by the PCI system, a hot removal command;
   receiving an indication that hot removal is complete; and
   issuing, by the PCI system to the boot loader, an indication that deconfiguration of the system capabilities is complete.

13. A computer program product for securely removing system capabilities, being available to at least one logical partition, from a logical partition, the logical partition being hosted by a computer system, the computer program product comprising:
   a computer readable storage medium readable by a processing circuit and storing instructions for execution by the processing circuit for performing a method comprising:
      providing, by a boot loader started in the logical partition of the computer system, an in-bound queue based transport protocol (QTP) instance;
      issuing by the QTP instance, a QTP removal request to remove system capabilities available to the boot loader;
      receiving, by the QTP instance, an acknowledgment of the QTP removal request; and
      issuing, by the boot loader, a deconfigure command to perform a hot removal of the system capabilities, wherein the system capabilities are not reconfigurable, the logical partition to remain activated while removing the system capabilities.

14. The computer program product according to claim 13, wherein the system capabilities comprise a queue based transport protocol device.

15. The computer program product according to claim 13, wherein the method further comprises adding a removal flag to system capabilities data, and wherein the removing the system capabilities by the deconfigure command comprises removing the system capabilities, based on the removal flag being enabled.

16. The computer program product of claim 13, wherein the computer system comprises a peripheral component interconnect (PCI) subsystem, and wherein performing the hot removal comprises:
   issuing, by the PCI system, a hot removal command;
   receiving an indication that hot removal is complete; and
   issuing, by the PCI system to the boot loader, an indication that deconfiguration of the system capabilities is complete.

17. A computer system for securely removing system capabilities, being available to at least one logical partition, from a logical partition, the logical partition being hosted by the computer system, the computer system comprising:
   a memory; and
   a processor in communication with the memory, wherein the computer system is configured to perform a method, said method comprising:
      providing, by a boot loader started in the logical partition of the computer system, an in-bound queue based transport protocol (QTP) instance;
      issuing by the QTP instance, a QTP removal request to remove system capabilities available to the boot loader;
      receiving, b the QTP instance, an acknowledgment of the QTP removal request; and
      issuing, by the boot loader, a deconfigure command to perform a hot removal of the system capabilities, wherein the system capabilities are not reconfigurable, the logical partition to remain activated while removing the system capabilities.

18. The computer system according to claim 17, wherein the system capabilities comprise a queue based transport protocol device.

19. The computer system according to claim 17, wherein the method further comprises adding a removal flag to system capabilities data, and wherein the removing the system capabilities by the deconfigure command comprises removing the system capabilities, based on the removal flag being enabled.

20. The computer system of claim 17, wherein the computer system comprises a peripheral component interconnect (PCI) subsystem, and wherein performing the hot removal comprises:
   issuing, by the PCI system, a hot removal command;
   receiving an indication that hot removal is complete; and
   issuing, by the PCI system to the boot loader, an indication that deconfiguration of the system capabilities is complete.

* * * * *